(12) United States Patent
Shetley

(10) Patent No.: US 6,843,236 B1
(45) Date of Patent: Jan. 18, 2005

(54) MULTI-PHASE FUEL SYSTEM

(76) Inventor: Michael Shetley, Rte. 6, Box 845, Okeechobee, FL (US) 34974

( * ) Notice: Subject to any disclaimer, the term of this patent is extended or adjusted under 35 U.S.C. 154(b) by 35 days.

(21) Appl. No.: 10/620,967

(22) Filed: Jul. 14, 2003

(51) Int. Cl.[7] ................................................. F25D 7/00
(52) U.S. Cl. ...................................................... 123/525
(58) Field of Search ................................ 123/525, 1 A, 123/527, 557

(56) References Cited

U.S. PATENT DOCUMENTS

| | | | |
|---|---|---|---|
| 4,151,821 A | | 5/1979 | Wichman, deceased et al. |
| 4,161,931 A | | 7/1979 | Giardini et al. |
| 4,210,103 A | * | 7/1980 | Dimitroff et al. ............ 123/1 A |
| 4,403,576 A | * | 9/1983 | Dimitroff et al. .............. 123/3 |
| 4,429,675 A | * | 2/1984 | Talbert ........................ 123/558 |
| 4,483,305 A | * | 11/1984 | Gilmor ......................... 123/557 |
| 4,538,583 A | | 9/1985 | Earl |
| 4,550,706 A | | 11/1985 | Hoffman |
| 4,606,319 A | | 8/1986 | Silva |
| 4,622,944 A | | 11/1986 | Earl |
| 4,665,879 A | | 5/1987 | Earl |
| 4,926,831 A | | 5/1990 | Earl |
| 5,314,007 A | * | 5/1994 | Christenson .................. 165/43 |
| 5,947,091 A | | 9/1999 | Krohn et al. |
| 6,119,637 A | | 9/2000 | Matthews et al. |

* cited by examiner

Primary Examiner—Henry O. Yuen
Assistant Examiner—Jason Benton

(57) ABSTRACT

The present invention provides a multi-phase fuel system for an internal combustion engine. More specifically, when the multi-phase fuel system is applied to a vehicle, the higher volatility. (lower boiling temperature) components of fuel are supplied to the engine in a vaporized gaseous form while the lower volatility (higher boiling temperature) components of fuel are supplied to the engine in an atomized liquid form. In this manner, the multi-phase fuel system is capable of providing a more optimum lean air/fuel mixture for better fuel economy and emissions control during normal operating conditions while being able to quickly enrich the fuel mixture in response to sudden increases in load demand.

49 Claims, 5 Drawing Sheets

FIG. 5

Reformer Fuel System
Mileage Tests

| Date | With Reformer Fuel System | Starting Mileage | Ending Mileage | Miles Driven | Fuel Used | Miles Per Gallon | City or Highway | Weather Conditions |
|---|---|---|---|---|---|---|---|---|
| 01/09/03 | | 39,712.0 | 39,912.5 | 200.0 | 11.89 | 16.82 | I-95 | 60 Degrees, Rain |
| 01/10/03 | YES | 39,990.7 | 40,068.9 | 78.2 | 1.55 | 50.45 | City, Highway | 54 Degrees |
| 01/14/03 | YES | 40,427.3 | 40,633.5 | 206.2 | 6.59 | 31.29 | City, Highway | 43 Degrees |
| 01/15/03 | YES | 40,697.0 | 40,757.0 | 60.0 | 1.78 | 33.70 | City Only | |
| 01/15/03 | | 40,757.0 | 40,799.0 | 42.0 | 2.80 | 15.00 | Heavy City | |
| 01/15/03 | | 40,799.0 | 40,824.7 | 75.7 | 1.77 | 43.01 | Highway | |
| 01/20/03 | YES | 41,778.0 | 41,946.1 | 166.1 | 3.84 | 43.80 | St. Augustine, 70 mph | Windy, Clear Skies |
| 01/20/03 | | 41,946.1 | 42,115.0 | 168.9 | 10.64 | 15.89 | I-95 | Windy, Clear Skies |
| 01/31/03 | YES | 44,628.0 | 44,721.0 | 93.0 | 1.69 | 55.02 | I-95 | 55 Degrees, Cloudy |
| 02/02/03 | YES | 45,006.5 | 45,108.4 | 101.9 | 1.87 | 54.43 | I-95 | |
| 02/10/03 | | 46,043.8 | 46,337.1 | 293.3 | 18.88 | 15.53 | | |
| 02/10/03 | YES | 46,392.6 | 46,536.8 | 144.2 | 3.23 | 44.64 | | |
| 02/10/03 | YES | 46,536.8 | 46,641.1 | 104.3 | 4.15 | 25.13 | I-95 | Blizzard, Rain, Wind |
| 02/12/03 | YES | 46,950.8 | 47,125.5 | 174.7 | 4.92 | 35.50 | 25% City, 85% Highway | |
| 02/12/03 | | 47,125.5 | 47,287.6 | 162.1 | 8.37 | 19.37 | City, Highway | |
| 02/17/03 | YES | 47,438.5 | 47,524.8 | 86.3 | 1.96 | 43.96 | I-95 | |
| 02/17/03 | | 47,524.8 | 47,611.5 | 86.7 | 4.14 | 20.96 | I-95 | |
| 02/27/03 | YES | 49,743.2 | 49,875.0 | 131.8 | 1.90 | 69.36 | Turnpike | |
| 02/28/03 | | 49,875.0 | 49,999.3 | 124.3 | 4.56 | 27.20 | I-95 | |
| 02/28/03 | YES | 50,003.6 | 50,110.6 | 107.0 | 1.86 | 57.30 | I-95 | |
| 03/03/03 | YES | 50,450.0 | 50,628.0 | 178.0 | 3.49 | 51.00 | | Hard Rain, Windy |
| 03/03/03 | | 50,628.0 | 50,758.7 | 130.7 | 5.71 | 22.89 | | |
| 03/05/03 | YES | 51,160.0 | 51,252.0 | 92.0 | 1.49 | 61.74 | I-95 | |
| 03/05/03 | YES | 51,252.0 | 51,361.7 | 109.7 | 3.66 | 30.05 | I-95 | |
| 03/05/03 | | 51,361.7 | 51,496.7 | 135.0 | 7.50 | 18.00 | 55% City, 45% Highway | |
| 03/19/03 | YES | 52,532.0 | 52,652.1 | 120.1 | 1.86 | 64.57 | Highway, Turnpike | |
| 03/25/03 | YES | 53,668.9 | 53,769.1 | 100.2 | 2.98 | 33.62 | City | |
| 03/25/03 | YES | 53,502.0 | 53,659.2 | 159.2 | 2.48 | 64.19 | | |

MULTI-PHASE FUEL SYSTEM

FIELD OF THE INVENTION

The present invention relates to a multi-phase fuel system for internal combustion engines. More specifically, the system utilizes heat to separate a single fuel into high volatility, e.g. lower boiling temperature, components and low volatility components, e.g. higher boiling temperature. The high volatility components are delivered to the engine as a gaseous vapor containing the atomized lower volatility components. During combustion the highly volatile gaseous vapor promotes complete combustion of the lower volatility atomized components. In this manner the multi-phase fuel system is able to provide improved efficiency and reduced emissions throughout the entire range of engine requirements.

BACKGROUND OF THE INVENTION

A fuel system is the component of an internal combustion engine which often has the greatest impact on performance and cost. Accordingly, fuel systems for internal combustion engines have received a significant portion of the total engineering effort expended to date on the development of the internal combustion engine. For this reason, today's engine designer has an extraordinary array of choices and possible permutations of known fuel system concepts and features.

Since the invention of the gasoline engine various attempts aimed at improving the efficiency of fuel systems have been made. Design effort typically involves extremely complex and subtle compromises among considerations such as cost, size, reliability, performance, ease of manufacture, and retrofit capability on existing engine designs. The challenge to contemporary designers has been significantly increased by the need to respond to government mandated emissions abatement standards while maintaining or improving fuel efficiency.

It is well known in the prior art to provide fuel in a liquid phase to a moving air stream for delivery to an internal combustion engine. Liquid fuel delivery systems, such as carburetors, were once standard for internal combustion engines. Carburetors use atomizing nozzles or jets which at least partially atomize the liquid fuel supplied to the engine. The nozzles aim the fuel at the throat of a venturi which, due to the sudden drop of pressure in the venturi, causes the liquid to break into small droplets of fuel. The small droplets of liquid fuel are then drawn into the cylinders of the engine for combustion.

Liquid phase fuel delivery systems, such as fuel injection, are the current standard for supplying liquid fuel to gasoline engines. Electrical pulses provided by the onboard computer cause the injectors to force liquid fuel through a nozzle. The nozzle breaks up the liquid fuel into small droplets. Some injectors aim their spray at a venturi for further atomization, others directly inject their spray into the intake manifold or combustion chamber.

While fuel injectors are generally capable of atomizing liquid fuel better than a carburetor, they still deliver the fuel in a liquid phase as small droplets of fuel. Small droplets of fuel do not burn completely during combustion causing decreased engine efficiency and increased fuel consumption. In addition, the unburned fuel is discharged into the atmosphere as a pollutant.

Devices of the prior art have attempted to overcome the problems associated with liquid phase fuel delivery systems by vaporizing the liquid fuel supplied to the engine. Fuel vaporization can be accomplished in a number of ways, including various mechanical means such as screens or venturis. Other devices use heat to vaporize the liquid fuel. The prior art contains a substantial number of suggestions directed to vaporizing liquid fuels with heat for use in an internal combustion engine. These solutions have generally centered around using the exhaust gases of the engine as a source of heat for accomplishing vaporization.

When compared to an engine operating from liquid phase fuel, an engine operating on vaporized fuel offers increased fuel economy and lower emissions. In their attempts to achieve maximum economy, the prior art has generally concentrated on operating an engine entirely on a vaporized liquid fuel such as gasoline. Because gasoline is comprised of a number of components which transform to a vapor phase at vastly different temperatures, there are a number of problems associated with vaporizing all of the components in sufficient quantities to supply a vehicle. The first such problem is an unavoidable delay associated with raising the temperature of the liquid fuel to a sufficient level to transform the fuel components with the highest boiling points to vapor. The delay adversely affects engine performance and causes poor throttle response. Numerous situations occur when operating a vehicle that require an immediate engine response time, e.g. accident avoidance and the like. While these situations only account for a small amount of total driving time, the delay associated with transforming the components of gasoline with the highest boiling temperatures to a vapor phase requires systems to be overbuilt or maintain a relatively large reserve supply of fuel vapor for acceptable operation. Overbuilt systems generally rely on excessive heat or large vaporizing apparatus to reduce response times. Reserve supplies of vaporized gasoline mixed with air are extremely volatile and may result in dangerous explosions.

A further problem associated with the overbuilt systems, that has not been adequately addressed by the prior art, involves the recognition that some gasoline components vaporize at about 95° F. while others require temperatures above 425° F. to completely vaporize. Overheating of the components with the lower boiling points may result in the formation of undesired gums and tars within the apparatus. Overheating the fuel also increases the risk of fire or explosion.

Still further problems exist with prior art systems which utilize sufficient heat to completely vaporize gasoline. When the incoming air is heated with the fuel, the heat significantly reduces air density thereby lowering the efficiency and power output of the engine. In addition, the highly heated air also results in an extremely dry air-fuel mixture. The dry air-fuel mixture does not provide adequate lubrication for the upper cylinder and the valve guides. This results in premature wear of the engine and significantly reduces its useful life.

Accordingly, what is lacking in the prior art is a cost effective multi-phase fuel system capable of separating the fuel into high volatility and low volatility components, and delivering the components to the engine in different phases to promote complete combustion and a lean air-fuel mixture. The multi-phase fuel system should achieve objectives such as providing improved efficiency, quick response, reliable engine performance, and emissions abatement. The system should include packaging flexibility for installation on various engine configurations including retrofitting existing engines with minimal modification of the original fuel system.

DESCRIPTION OF THE PRIOR ART

A number of prior art systems exist for completely vaporizing liquid fuel. Most of the systems utilize hot exhaust gases or electrical elements to achieve the high temperatures necessary to vaporize all of the fuel components, while others use a combination of both exhaust gas and electrical elements.

U.S. Pat. No. 5,947,091 to Krohn et al. discloses a fuel injector having an internally mounted heating element. The device is aimed at reducing emissions during cold engine start and warm-up periods. During these periods fuel is vaporized as it passes through the injector and directly into the combustion chamber. The patent also discloses the possibility of continuous operation by directing hot exhaust gases through an optional gas channel that surrounds the body of the injector, but fails to disclose any method of controlling the heat within the device. As disclosed, this device is only capable of vaporizing liquid fuel during periods of low fuel flow to the engine. During high fuel flow the fuel would merely be heated before entering the combustion chamber. The patent fails to teach or suggest a fuel system capable of converting the lower boiling temperature components of gasoline into vapor, atomizing the higher boiling components, and supplying a combination of the two phases of fuel to the engine for a lean burning mixture. In addition, this system requires the original fuel system to be removed from the vehicle.

U.S. Pat. No. 4,926,831 to Earl discloses a fuel vaporization apparatus in which fuel is completely vaporized before it enters the internal combustion engine. The liquid fuel is routed through two combination vaporization chamber/exhaust manifolds heated by exhaust gasses. The device is aimed at providing vaporized fuel for normal and heavy acceleration. A single heat exchange plate separates the vaporization chamber and the exhaust manifold. An electric fuel pump provides liquid fuel to foggers that spray fuel into the vapor chambers. An air pump provides air to the vapor chambers so that upon depression of the accelerator pedal the vaporized fuel will flow through the carburetor of the engine. The engine is started on liquid fuel, but after the vaporizing chamber reaches a preset temperature the liquid fuel system is shut off from the fuel supply. This system requires extensive modification of the vehicle engine compartment for installation. In addition, the thrust of the invention is vaporizing all components of the gasoline, therefore the device has all of the shortcomings associated therewith.

U.S. Pat. Nos. 4,538,583, 4,622,944, and 4,665,879, also to Earl, disclose fuel vaporization apparatus in which the fuel vaporizes before it enters the internal combustion engine. The engine is started on liquid fuel, but after the vaporizing chamber reaches a preset temperature the liquid fuel system is shut off from the fuel supply. After the vapor chamber reaches a temperature sufficient to vaporize all of the gasoline components, the liquid fuel is fed through various amounts and configurations of heat conductive tubing which is exposed to hot exhaust fumes and electrical heating elements. This design fails to control the temperature of the apparatus and must maintain reserve vapors for peak demands. Additionally, due to the location and volume of the fuel vapors, an engine backfire could result in a serious explosion.

U.S. Pat. No. 4,606,319 to Silva discloses a dual fuel apparatus that operates entirely from gaseous and vaporized fuel. The engine is started on a primary fuel such as methane, hydrogen, natural gas, propane, butane or acetylene. When the exhaust reaches an adequate temperature gasoline is allowed to flow into a vaporization apparatus. The primary fuel mixes with the vaporized gasoline and pushes the mixed fuel vapors to the carburetor. This configuration would require significant modification to install the system on a vehicle that is currently equipped with a liquid fuel system.

U.S. Pat. No. 4,161,931 to Giardini et al. discloses an exhaust gas heat exchanger for vaporizing liquid fuel. The engine is started using vaporized fuel stored in an accumulator and thereafter uses the exhaust manifold to vaporize liquid fuel. The exhaust manifold consists of two generally parallel chambers and a diverter valve. Within one of the vaporizing chambers is a length of spirally wound heat conductive tubing. Liquid fuel is allowed to flow through the tube while the diverter valve controls the temperature within the tube-containing chamber. Vaporized fuel is stored in an accumulator before being supplied to the engine. This device recognizes that the temperature of the heat exchanger needs to be regulated. However, this system requires the use of complex servomechanisms and sensors. Due to its complexity, this device is not well suited for retrofitting on existing vehicles with gasoline engines. The configuration also requires a reserve supply of fuel vapor for peak demands, increasing the risk of explosion.

U.S. Pat. No. 4,550,706 to Hoffman discloses a liquid fuel vaporization device. The device utilizes a plurality of elongated electrical elements mounted within the main air stream entering the engine. During warm-up or acceleration a thermostatically or mechanically controlled valve allows an air pump to deliver a pre-vaporized mixture of air and fuel into the venturi. After warm-up, liquid fuel is sprayed onto the elongated heating elements and vacuum from the engine draws the vaporized fuel mixture across the heated elements as it enters the engine. This configuration holds a substantial amount of fuel vapor and air in an elongated air intake and does not disclose any means of containing the vaporized fuel within the device, thereby creating a significant risk of explosion. In addition, heating all of the air entering the engine to a sufficient temperature to completely vaporize gasoline lowers air density and significantly reduces engine performance.

U.S. Pat. No. 4,151,821 to Witchman, deceased et al., discloses an engine fuel system in which gas is vaporized in an atomization chamber prior to being fed into the internal combustion engine. An alternative gaseous fuel is used during start-up until the atomization chamber reaches a sufficient temperature to vaporize gasoline. After warm-up, liquid fuel is sprayed by jet nozzles against a metal plate which is heated by exhaust gases. The resulting vaporized gasoline is then supplied to a carburetor.

U.S. Pat. No. 6,119,637 to Matthews et al., discloses a coolant heated on-board gasoline distillation system for reduced emissions at start-up. The device partially vaporizes the engine's primary fuel. The vaporized components are then re-condensed to a liquid and transferred to a second fuel tank. During initial start-up of the engine the secondary fuel is allowed to flow through the standard liquid fuel delivery system, e.g. carburetor or fuel injection. After start-up the secondary fuel is shut off and the primary fuel is consumed. This type of system offers reduced emissions during the short warm-up cycle of the engine. However, the primary fuel consumed after warm-up combusts poorly, causing spark knock and increased emissions.

The prior art devices fail to teach or suggest the use of a system capable of separating the components of a liquid fuel, e.g. gasoline, and delivering them to the engine in at least two different phases to enhance combustion and reduce emissions. The prior art is also deficient in teaching a fuel vaporization system that does not detrimentally affect air density. The references are further deficient in teaching a multi-phase fuel system that can be easily installed on new, as well as existing, engines with minimal modification of the original fuel system.

SUMMARY OF THE INVENTION

The present invention provides a multi-phase fuel system for an internal combustion engine. More specifically, when the multi-phase fuel system is applied to a vehicle, the higher volatility (lower boiling temperature) components of fuel are supplied to the engine in a gaseous vapor form while the lower volatility (higher boiling temperature) components of fuel are supplied to the engine in an atomized form. In this manner, the multi-phase fuel system is capable of providing a more optimum lean air/fuel mixture for better fuel economy and emissions control during normal operating conditions while being able to quickly enrich the fuel mixture in response to sudden increases in load demand.

The liquid fuel is generally hydrocarbon fuel, such as gasoline, which is typically comprised of various components such as Pentane, Hexane, Heptane, Octane, Nonane, Decane and Hendacane. These components vaporize at temperatures that range between 95° F. and 450° F. It is well known in the art that the components of gasoline with the lowest boiling points generate lower emissions and higher gas milage per unit than the components with higher boiling points. The instant invention is constructed and arranged to vaporize the higher volatility components of the fuel and use the highly volatile gaseous vapor to promote combustion of the atomized lower volatility fuel components. When compared to systems that concentrate on vaporizing all of the liquid fuel, the lower temperatures required by the instant invention allow the reformer fuel system to react faster to engine demands, thereby eliminating the lag normally associated with total vapor fuel systems.

The multi-phase fuel system generally comprises a canister, at least one fuel injector, at least one heating element, a fuel supply, a fuel pressure regulator, an optional fresh air control means, and an optional gas mixer.

In a preferred embodiment the canister is generally a heavy walled tube including a first open end constructed and arranged as an air intake, and a second end constructed and arranged to cooperate with a throttle body of a fuel injection system. The sidewall of the canister is generally constructed to provide support for at least one electric fuel injector and at least one electric heating element. The sidewall of the canister may also be configured to provide support for the optional air control means and the fuel regulator. The heating element(s) are arranged within the bore of the tube to be in the direct path of the atomized fuel discharged from the fuel injector. Air flowing through the canister bore carries the gaseous fuel, atomized fuel and fresh air mixture into the engine for combustion.

In a second embodiment the canister is generally a heavy walled tube having a first end with an aperture constructed and arranged to cooperate with at least one electric fuel injector, and a second end constructed and arranged to cooperate with an air-gas mixing device. The sidewall of the canister is generally constructed to provide support for at least one electrical heating element and at least one fresh air control means. The heating element(s) are arranged within the bore of the tube to be in the direct path of the fuel and air flowing through the canister's reformer chamber. During operation a small amount of fresh air is drawn through the air valve means into the bore of the canister. The fresh air mixes with the multi-phase fuel and the air-gas mixer allows the mixture to flow to the engine based on demand.

The construction of the systems allow the engine to be cold started directly with either a multi-phase fuel system or the factory installed fuel injection system. When the engine is operated using one of the multi-phase fuel systems, electric current is allowed to flow from the battery through the heating element(s) to raise the temperature within the canister to about 250° F. The vehicle's on-board computer operatively controls the fuel injector(s) to spray liquid fuel into the bore of the canister. The fuel injector finely atomizes the liquid gasoline and directs it across the electrical heating element(s). Since the heating element(s) maintain the temperature of the reformer chamber at a temperature of, for example 250° F., and since the liquid gasoline consists of various mixtures of gasoline components which vaporize within a range of 95° F. for Pentane to about 450° F. for Hendacane, the higher volatility (low boiling temperature) components of the gasoline will vaporize as the gasoline flows through the canister, while the lower volatility (higher boiling temperature) fuel will remain in an atomized state.

As engine vacuum draws fresh air through the normal air intake passage, a small amount of incoming air may be allowed to flow through the air control means, preferably a check valve, into the canister. The fresh air entering the canister mixes with the vaporized and atomized fuel and then flows out of the canister to mix with the primary incoming air, and may flow through an optional air-gas mixer before flowing to the engine for combustion.

In this manner the air control means blocks the intake orifice to prevent the air/fuel mixture from flowing out of the vapor canister and into the engine compartment, but allows air to flow into the canister to push the air/fuel mixture to the engine when the pressure differential across the check-valve is sufficient to overcome the check valve.

The multi-phase fuel system can thereby provide improved fuel economy and reduced emissions over vehicles operating entirely from liquid fuel or from completely vaporized fuel. The system can also provide immediate throttle response that vapor only systems cannot provide without maintaining a relatively large amount of reserve vaporized fuel. This system also offers improved safety by not allowing fuel vapor to escape from the system into the engine compartment.

Accordingly, it is an objective of the present invention to provide a fuel system capable of separating the components of a single fuel, e.g. gasoline, and delivering them to the engine in at least two different phases to enhance combustion and reduce emissions.

Yet an additional objective of the present invention is to provide a fuel system capable of providing a combination of vaporized high volatility (lower boiling temperature) fuel and atomized lower volatility (higher boiling temperature) fuel based on engine demands that requires minimal modifications to the factory fuel system.

It is a further objective of the present invention to provide a fuel system capable of providing a combination of vaporized high volatility (lower boiling temperature) fuel and atomized lower volatility (higher boiling temperature) fuel based on engine demands that eliminates the need to store excessive amounts of vaporized fuel.

A still further objective of the present invention is to provide a fuel system capable of providing a combination of vaporized high volatility (lower boiling temperature) fuel and atomized lower volatility (higher boiling temperature) fuel based on engine demands that can be installed on existing as well as new vehicles.

Another objective of the present invention is to provide a kit for a fuel system capable of separating the components of a single fuel, e.g. gasoline, and delivering them to the engine in at least two different phases to enhance combustion and reduce emissions based on engine demands which is simple to install and which is ideally suited for original equipment and aftermarket installations.

Yet another objective of the present invention is to provide a kit for a fuel system capable of providing a combination of vaporized high volatility (lower boiling temperature) fuel and atomized lower volatility (higher boiling temperature) fuel based on engine demands that can be inexpensively manufactured and which is simple and reliable in operation.

Still another objective of this invention is to provide a method of separating a single fuel into its higher volatility and lower volatility components and delivering them to the engine in at least two different phases to enhance combustion and reduce emissions.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 5 is a chart illustrating milage tests performed on the present invention.

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
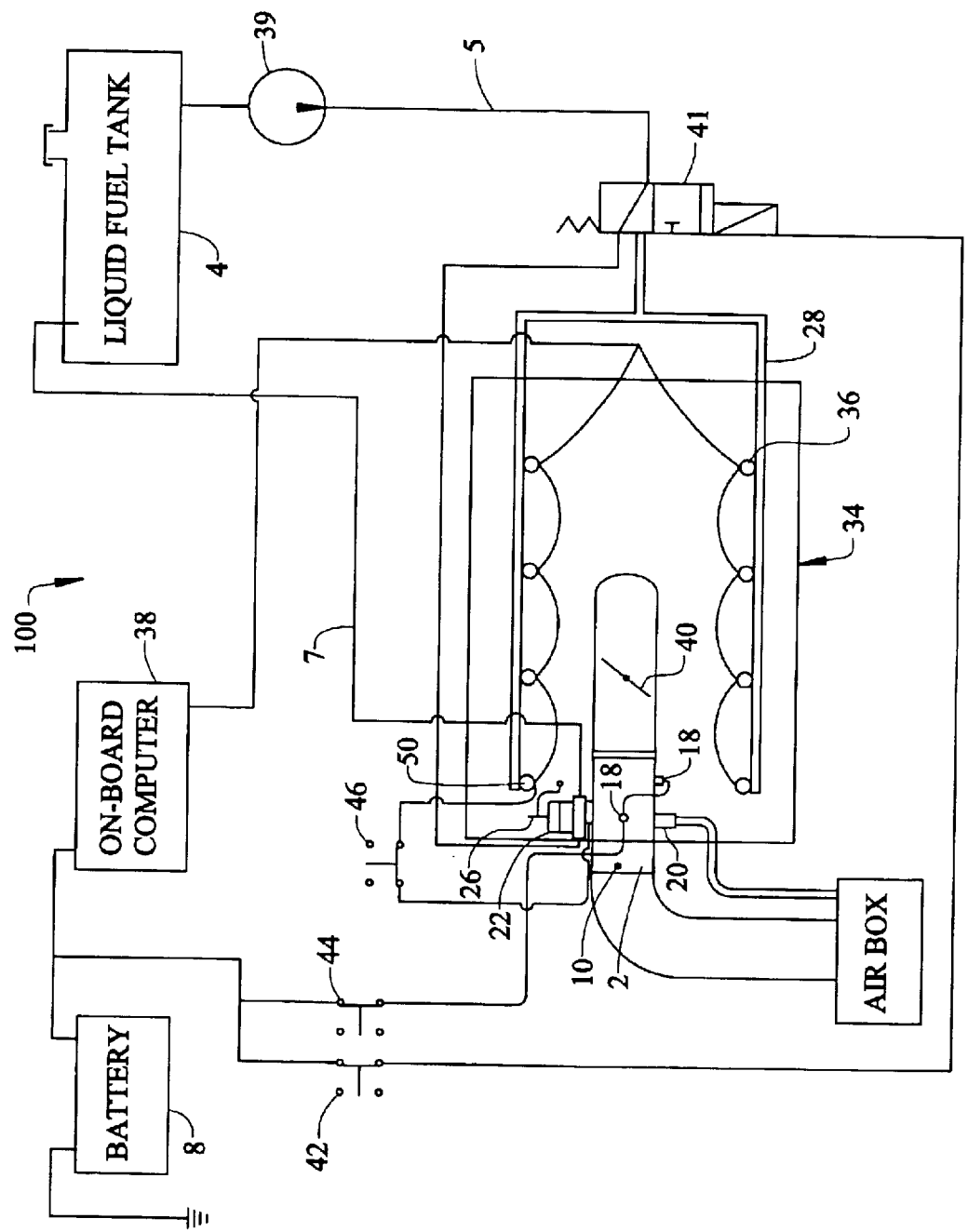
FIG. 1 is a schematic representation illustrating one embodiment of the multi phase fuel system of the present invention.

In order to alleviate the problems associated with operating an internal combustion engine entirely from liquid fuel or entirely from vaporized liquid fuel, the present invention utilizes a multi-phase fuel system 100 as set forth in FIG. 1. The multi-phase fuel system separates the components of a single fuel, e.g. gasoline, and delivers the higher volatility (lower boiling temperature) components of the fuel to the engine 34 in a gaseous vaporized form while the lower volatility (higher boiling temperature) components of the fuel are supplied to the engine in an atomized form. The multi-phase fuel system is capable of providing a more optimum lean air/fuel mixture for better fuel economy and emissions control during normal operating conditions while being able to quickly enrich the fuel mixture in response to sudden increases in load demand.

Figure 2:
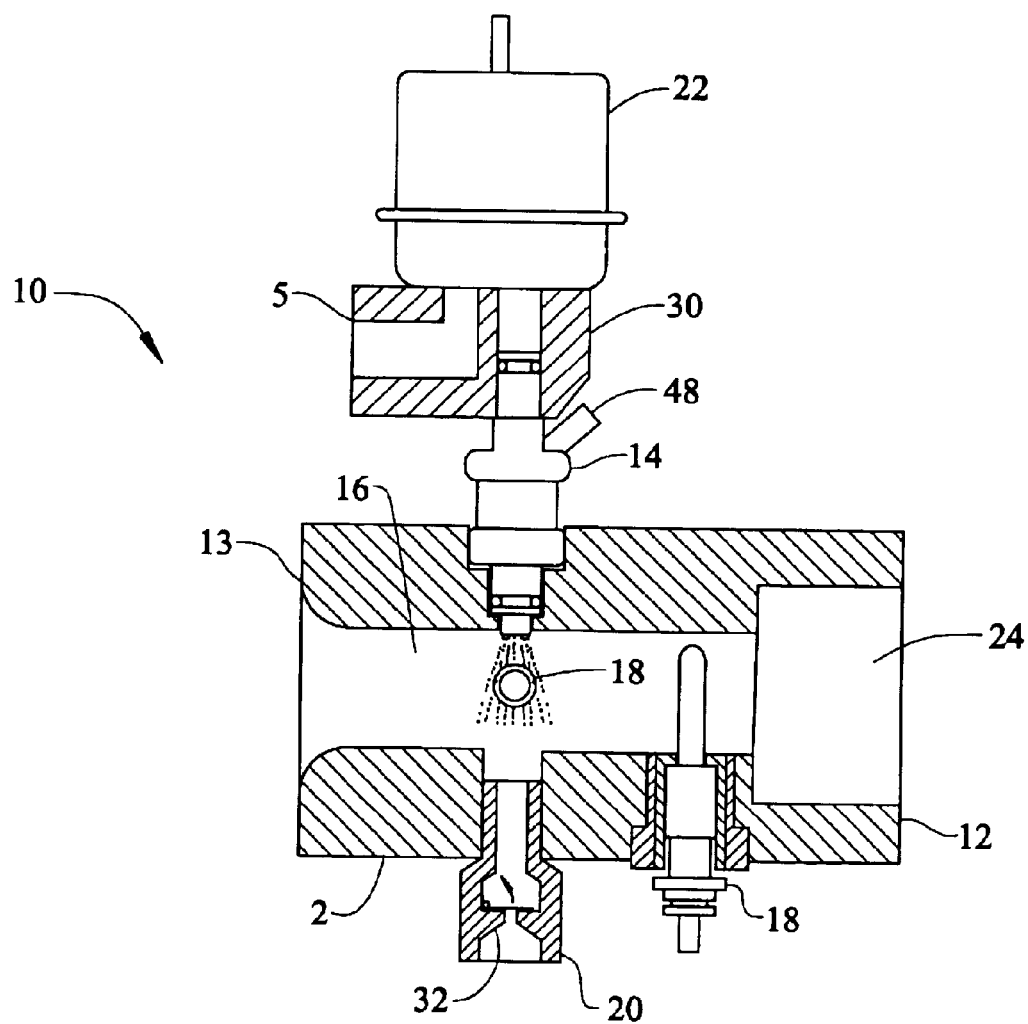
FIG. 2 is a section view illustrating one embodiment of the canister assembly of the present invention.
Figure 3:
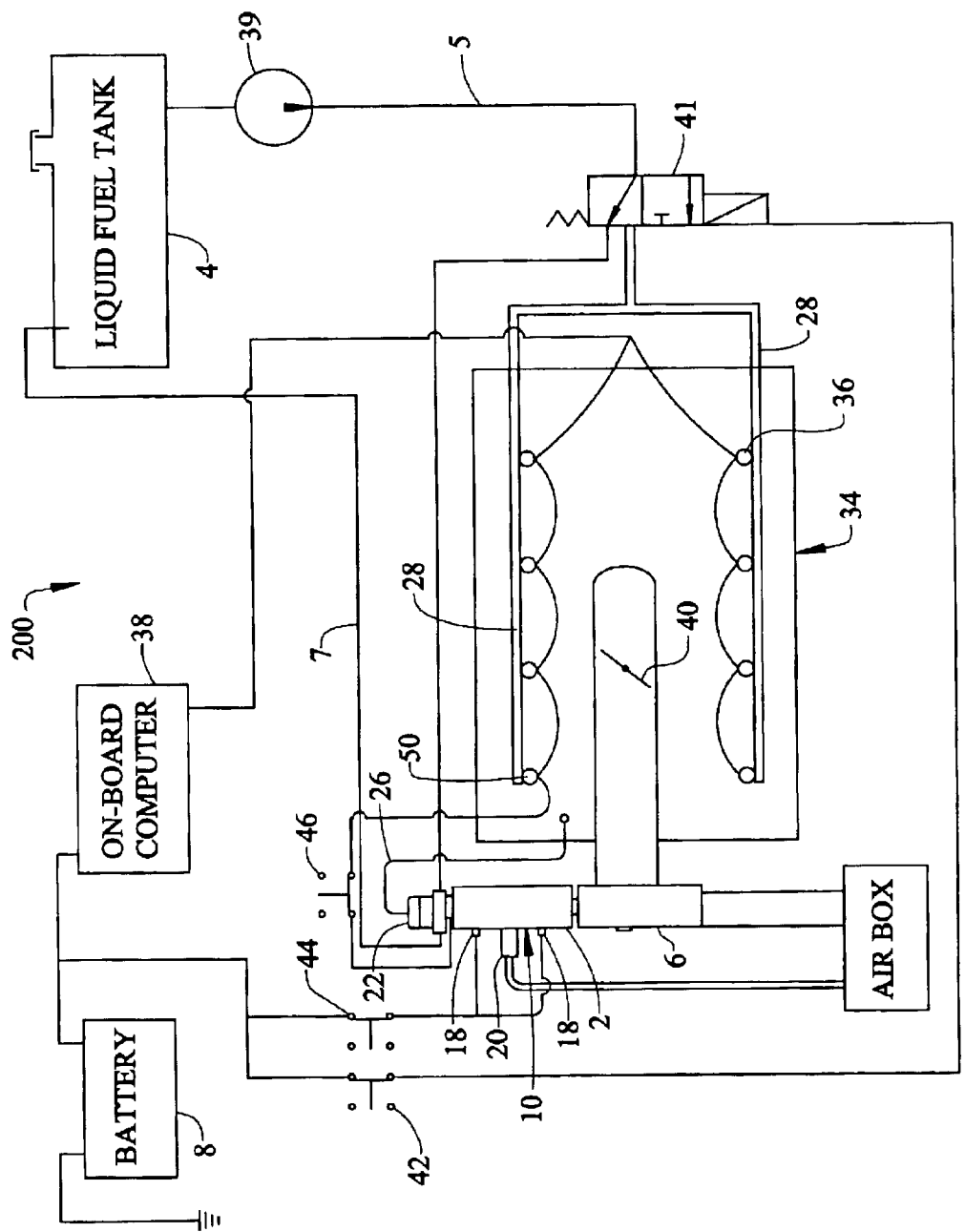
FIG. 3 is a schematic representation illustrating an alternative embodiment of the multi phase fuel system of the present invention.

In accordance with FIGS. 1 and 2, a preferred embodiment is illustrated installed on a typical internal combustion engine 34 having a plurality of electric fuel injectors 36 operatively controlled by an on board computer 38. The multi-phase fuel system 100 generally includes a means for supplying a mixture of vaporized lower temperature boiling components of fuel and atomized higher temperature boiling components of gasoline to an engine illustrated herein as a canister assembly and an optional gas mixer 6 (FIG. 3). The multi-phase fuel system components are constructed and arranged to be installed and operated either as a fuel system parallel to the standard fuel injection or as a stand alone fuel system for an internal combustion engine. When operated as a parallel system, the reformer fuel system is generally adapted to utilize the vehicle's existing liquid fuel supply 4, fuel pump 39, electrical supply 8, on board computer 38, and throttle plate 40. A fuel diverter valve 41 may be utilized for routing the liquid fuel between the multi-phase fuel system 100 and the factory installed injector system 36. The diverter valve 41 may be operated by a manual switch 42 or may be automatically operated by the vehicle's ignition switch or on board computer using suitable electrical devices well known in the art. The multi-phase fuel system 100 may also be provided with a manual switch 44 for allowing electrical current to flow to the heating element means 18 and a manual switch 46 for allowing electrical signals to reach the fuel modulating means 14. These switches may also be automatically operated by the vehicle's ignition switch or on board computer using suitable electrical devices well known in the art. In this manner, the multi-phase fuel system 100 can be configured to allow the vehicle's operator to choose between operating the engine with the multi-phase fuel system 100 or the standard liquid fuel injection delivery system. Alternatively, the multi-phase fuel system 100 can be configured to be the primary fuel delivery system, wherein the system initiates during the engine starting cycle. Referring to FIG. 2, the canister assembly 10 of the multi-phase fuel system 100 is illustrated. The canister assembly 10 generally includes at least one fuel injector 14, at least one heating element 18, at least one fresh air control means 20, and an optional fuel pressure regulator 22.

The canister 2 is generally comprised of a thick walled tube having a first end 13 constructed and arranged as a fresh air intake and a second end 12 constructed and arranged to cooperate with the throttle body of a fuel injected engine (FIG. 1). The canister 2 forms an enclosure surrounding the interior bore 16. In the preferred embodiment the volume of interior bore 16 is approximately 1.75 cubic inches. Larger or smaller bores may also be utilized on engines with large or small displacements, with the optimum size bore being determined by routine experimentation. The canister 2 is preferably constructed of aluminum, but may be constructed of other suitable materials well-known in the art which are capable of withstanding contact with fuel and capable of adequate heat resistance. As an alternative embodiment, the canister 2 may have at least one insulating layer of a suitable material well known in the art covering or at least partially covering the surface of the canister.

Removably mounted in the side wall of canister 2 are a plurality of generally concentric bores arranged for removably attaching and locating a fuel injector 14, and at least one, and preferably two, heating element means, illustrated herein as electric glow plugs 18 for heating the interior bore 16 of the canister 2. The heating element means should be capable of maintaining the temperature of the canister bore preferably at about 250° F. Devices such as resistors, rectifier bridges, potentiometers or other suitable devices well known in the art may be used for operational control of the heating elements. Such devices may also incorporate a separate temperature sensor and/or function in concert with the on-board computer 38 to control the heating element(s) in order to maintain the temperature within the canister bore 16. At least one fuel injector 14 is removably attached within the concentric bores located within the side of the canister 2. The at least one fuel injector is preferably a high performance and high volume electric fuel injector capable of modulating an adequate amount of fuel to the canister bore 16 for efficient operation of the engine 34. Such a fuel injector is currently manufactured by Ford Motor Company and is being used for racing applications. The fuel injector is preferably wired, via connector 48, to receive electrical signals from the on-board computer 38 in parallel with the number one cylinder 50, but may be wired to receive electrical signals in parallel with any suitable cylinder. In this manner the on board computer 38 can utilize various sensors, standard to the vehicle, to monitor the engines 34 operating parameters for operational control of the fuel injector(s) 14. The fuel injector 14 is preferably provided with a liquid fuel regulating means which is in fluid communication with the liquid fuel supply 4 via fuel conduit 5. The fuel regulating means is illustrated herein as a fuel pressure regulator 22 controlled by engine vacuum supplied through vacuum conduit 26 (FIG. 1) which is preferably in fluid communication with the engine's intake manifold. The fuel pressure regulator 22 is adapted to mate with the fuel injector 14 and the fuel rail 28 (FIG. 1) via the regulator block 30 and thereby control the pressure of liquid fuel delivered to the fuel injector 14, returning unused liquid fuel to the tank via line 7 (FIG. 1). Other suitable devices well known in the art that are capable of delivering a relatively constant pressure or volume of liquid fuel could be used as a liquid fuel regulating means.

Also removably mounted in the side wall of the canister 2 is the optional air inlet control means illustrated herein as a check valve 20 having an aperture 32 passing therethrough in fluid communication with fresh air and the canister bore 16. The check valve 20 allows fresh air to enter the canister bore 16 when the pressure differential across the checkvalve is sufficient to overcome the check valve spring (not shown). The check valve 20 preferably opens when the pressure differential is about one pound per square inch, but may be more or less depending on the desired fuel intake characteristics and can be determined by routine experimentation. The diameter of the aperture is preferably about ⅜ inches, but the optimum size may vary based on engine displacement and should be determined by routine experimentation. In this manner the check-valve 20 blocks the intake aperture 32 to prevent the air/fuel mixture from flowing out of the canister bore 16 and into the engine compartment, but allows air to flow into the canister bore to push the air/fuel mixture to the engine 34. Alternatively, air may be injected into the canister by devices and/or methods well known in the art that are capable of delivering a controlled amount of air to the canister bore.

Provided in the second end 12 of the canister 2 is a air-fuel outlet 24 in fluid communication with the engine's throttle body 40. The throttle body 40 is constructed and arranged to allow the air/fuel mixture from the canister bore 16 to enter and mix with the engine's incoming airstream. Other suitable devices well known in the art that are capable of mixing the air/fuel mixture from the canister bore 16 with the incoming airstream of the engine may also be utilized. The canister 2 is preferably constructed and arranged to be removably and sealably attached to the throttle body 40. Alternatively, the canister 2 and the throttle body 40 may be constructed as a single unitary piece.

Figure 4:
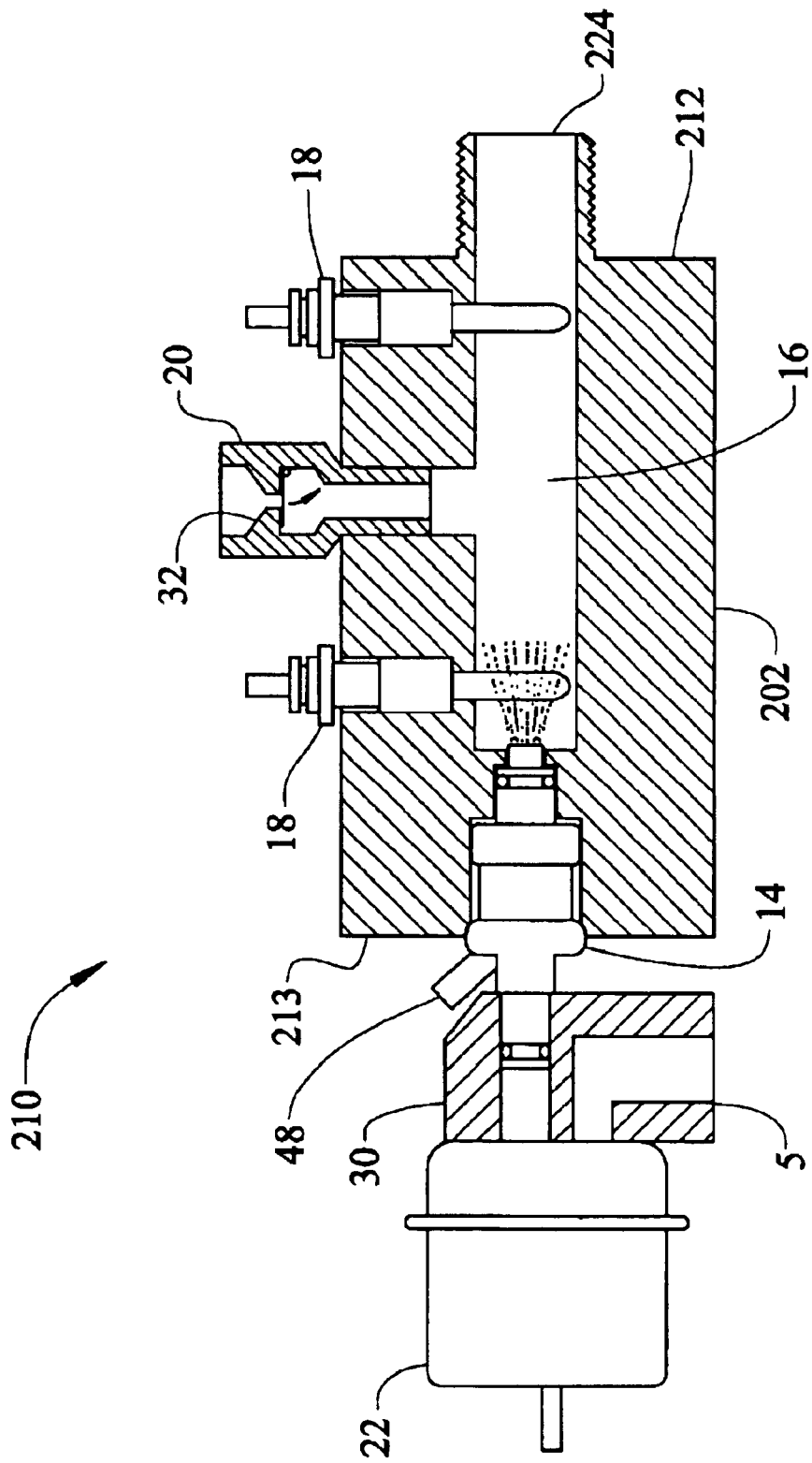
FIG. 4 is a section view illustrating an alternative embodiment of the canister assembly of the present invention.

Referring to FIGS. 3 and 4, an alternative embodiment of the multi-phase fuel system 200 and canister assembly 210 is illustrated. The alternative embodiment canister assembly 210 generally includes at least one fuel injector 14, at least one heating element 18, at least one fresh air control means 20, and an optional fuel pressure regulator 22.

The canister 202 is generally comprised of a thick walled tube having a first end 213 constructed and arranged with a plurality of centrally located bores arranged for removably attaching and locating a fuel injector 14, and a second end 212 constructed and arranged to cooperate with an air-gas mixer 6 (FIG. 3). The canister 202 forms a sealed enclosure surrounding the canister bore 16. In the preferred embodiment the volume of canister bore 16 is approximately 1.75 cubic inches. Larger or smaller bores may also be utilized on engines with large or small displacements, with the optimum size of canister bore being determined by routine experimentation. The canister 202 is preferably constructed of aluminum, but may be constructed of other suitable materials well-known in the art which are capable of withstanding contact with fuel and capable of adequate heat resistance. As an alternative embodiment the canister 202 may have at least one insulating layer of a suitable material well known in the art covering or at least partially covering the surface of the canister.

Removably mounted in the side wall of canister 202 is at least one, and preferably two, heating element means, illustrated herein as electric glow plugs 18 for heating the canister bore 16 of the canister 202. The heating element means should be capable of maintaining the temperature of the canister bore preferably at about 250° F. Devices such as resistors, rectifier bridges, potentiometers or other suitable devices or methods well known in the art may be used for operational control of the heating elements. Such devices may also incorporate a temperature sensor and/or the on-board computer 38 to control the heating element(s) in order to maintain the temperature within the canister bore 16.

At least one fuel injector 14 is removably attached within the centrally located bores of the first end 213 of the canister 202. The fuel injector is preferably a high performance and high volume electric fuel injector capable of modulating an adequate amount of fuel to the canister bore 16 for efficient operation of the engine 34. Such a fuel injector is currently manufactured by Ford Motor Company and is being used for racing applications. The fuel injector is preferably wired, via connector 48 to receive electrical signals from the on-board computer 38 in parallel with the number one cylinder 50, but may be wired to receive electrical signals in parallel with any suitable cylinder. In this manner the on board computer 38 can utilize various sensors, standard to the vehicle, to monitor the engines 34 operating parameters for operational control of the fuel injector(s) 14. The fuel injector 14 is preferably provided with a liquid fuel regulating means which is in fluid communication with the liquid fuel supply 4 via fuel conduit 5. The fuel regulating means is illustrated herein as a fuel pressure regulator 22 controlled by engine vacuum supplied through vacuum conduit 26 which is preferably in fluid communication with the engine's intake manifold. The fuel pressure regulator 22 is adapted to mate with the fuel injector 14 and the fuel rail 28 via the regulator block 30 and thereby control the pressure of liquid fuel delivered to the fuel injector 14. Other suitable devices well known in the art that are capable of delivering a relatively constant pressure or volume of liquid fuel could be used as a liquid fuel regulating means.

Also in the side wall of the canister 202 is the air inlet control means illustrated herein as a check valve 20 having an aperture 32 passing therethrough in fluid communication with fresh air and the canister bore 16. The check valve 20 allows fresh air to enter the canister bore 16 when the pressure differential across the check-valve is sufficient to overcome the check valve spring. The check valve 20 preferably opens when the pressure differential is about one pound per square inch but may be more or less depending on the desired fuel intake characteristics and can be determined by routine experimentation. The diameter of the aperture is preferably about ⅜ inches, but the optimum size may vary based on engine displacement and should be determined by routine experimentation. In this manner the check-valve 20 blocks the intake aperture 32 to prevent the air/fuel mixture from flowing out of the canister bore 16 and into the engine compartment, but allows air to flow into the canister bore to push the air/fuel mixture to the engine 34.

Provided in the second end 212 of the canister 202 is a air-fuel outlet 224 in fluid communication with the fuel mixer 6 (FIG. 3). The fuel mixer 6 is constructed and arranged to allow the air/fuel mixture from the canister bore 16 to enter and mix with the engine's incoming airstream. Such a fuel mixer is currently manufactured by Impco Carburetion Inc. of Cerritos, Calif. Other suitable devices well known in the art that are capable of mixing the air/fuel mixture from the canister bore 16 with the incoming airstream of the engine may also be utilized. Such devices may include but should not be limited to plunger valves, reed valves, solenoid valves, rotary valves and the like. In a preferred embodiment the gas mixer should be constructed and arranged to substantially prevent the escape of residual vaporized fuel into the engine compartment area of the vehicle after the engine is shut off. The canister 202 is preferably constructed and arranged to be removably and sealably attached to the fuel mixer 6. Alternatively, the canister 202 and the fuel mixer 6 may be constructed as a single unitary piece.

In an alternative non-limiting embodiment the side wall of the canister 202 may include a removably mounted sensor (not shown) for monitoring the temperature of the canister bore 16. The temperature sensor should be capable of communication with the vehicle's on-board computer 38. In this embodiment the vehicle's on-board computer is capable of operational control of the glow plug(s) 18 based on communication from the temperature sensor to maintain the desired temperature within the canister bore 16.

In FIG. 5, a representative portion of comparative road tests are illustrated wherein the Multi-phase Fuel System was installed on a 1999 Ford Expedition with a 5.4 liter engine having fuel injection. The tests were conducted in consecutive series by filling the fuel tank with 89 octane gasoline, driving the vehicle a predetermined number of miles, and again refilling the tank to establish the quantity of fuel consumed for the distance traveled, thereby effectively eliminating any errors attributed to differences in filling characteristics at filling stations. Typically the vehicle was driven along a predetermined course utilizing the reformer fuel system and returned along the same predetermined course utilizing the factory fuel injection system for a direct comparison of the two systems. The milage traveled and the quantity of fuel consumed were thereafter recorded with remarks for conditions encountered.

Comparison tests were conducted over a distance of about 13,000 miles with approximately half of the miles driven utilizing the multi-phase fuel system and approximately half of the miles driven using the factory original fuel injection system. Test conditions varied with temperatures ranging between 19° F. and 90° F.; heavy winds and heavy rains were also encountered. Over the complete series of tests, with city and highway driving combined, the vehicle averaged about 44.54 mpg using the Reformer Fuel System and 18.50 mpg using the factory installed fuel injection system.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A multi-phase fuel system for use with an internal combustion engine for providing a combination of gaseous vaporized high volatility components of gasoline and atomized liquid lower volatility components of gasoline to said engine based on engine demands, comprising:

a fuel source which exists in a liquid state at normal atmospheric pressure and temperature;

a fuel delivery means in fluid communication with said fuel source for delivering said liquid fuel from said fuel source to said multi-phase fuel system;

a separator means for heating said liquid fuel and supplying a mixture of vaporized lower boiling temperature components of said liquid fuel and atomized higher boiling temperature components of said liquid fuel to said engine, said separator means in fluid communication with said fuel source;

an on-board computer for monitoring fuel requirements as a function of engine demand, said on-board computer in operational control of said fuel delivery means.

2. The multi-phase fuel system as set forth in claim 1, wherein said multi-phase fuel system includes an air-gas mixing device;

wherein said air-gas mixing device utilizes intake manifold pressure of said engine to control the amount of said vaporized low boiling components of fuel and said atomized high boiling components of fuel introduced into the airstream entering said engine.

3. The multi-phase fuel system as set forth in claim 2, wherein said air-gas mixing device includes a plunger valve; wherein said plunger valve closes to substantially reduce the amount of residual vaporized and atomized fuel contained within said separator means from escaping therefrom.

4. The multi-phase fuel system as set forth in claim 1, including a liquid fuel regulating means for regulating said liquid fuel supplied to said multi-phase fuel system by said fuel delivery means.

5. The multi-phase fuel system as set forth in claim 4, wherein said liquid fuel regulating means includes a pressure regulator for regulating the pressure of said liquid fuel supplied to said fuel delivery means.

6. The multi-phase fuel system as set forth in claim 5, wherein said pressure regulator utilizes engine manifold vacuum to regulate the pressure of said liquid fuel supplied to said multi-phase fuel system by said fuel delivery means.

7. The multi-phase fuel system as set forth in claim 4, wherein said liquid fuel regulating means includes a liquid fuel flow regulator.

8. The multi-phase fuel system as set forth in claim 7, wherein said liquid fuel flow regulator is operatively controlled by said on board computer.

9. The multi-phase fuel system as set forth in claim 1, wherein said separator means includes:
   a canister, said canister having an internal bore, a fresh air inlet aperture and an air-fuel mixture outlet aperture;
   at least one heating element means for supplying heat to said canister bore, said heating element means being removably attached to said canister;
   at least one fuel modulating means for controlling liquid fuel admitted into said canister bore, said fuel modulating means constructed and arranged for removable attachment to said canister, said fuel modulating means in electrical communication and operatively controlled by said on-board computer.

10. The multi-phase fuel system as set forth in claim 9, wherein said heating element means is in electrical communication and operatively controlled by at least one electrical switch.

11. The multi-phase fuel system as set forth in claim 9, wherein said heating element means is in electrical communication and operatively controlled by said on board computer.

12. The multi-phase fuel system as set forth in claim 9, wherein said heating element means for supplying heat to said vaporizing chamber comprises at least one electrical glow plug.

13. The multi-phase fuel system as set forth in claim 9, wherein said heating element means includes at least one resistor, said at least one resistor constructed and arranged to operatively control the temperature of said heating element means.

14. The multi-phase fuel system as set forth in claim 9, wherein said heating element means includes at least one rectifier bridge, said at least one rectifier bridge constructed and arranged to operatively control the temperature of said heating element means.

15. The multi-phase fuel system as set forth in claim 9, wherein said canister bore includes at least one sensor for monitoring temperature within said canister bore, said sensor being removably attached to said canister, said sensor being in electrical communication with said on-board computer; wherein said on board computer utilizes said sensor to operatively control said heating elements means to regulate temperature within said canister bore.

16. The multi-phase fuel system as set forth in claim 9, wherein said fuel modulating means for controlling liquid fuel admitted into said canister bore comprises at least one fuel injector, said fuel injector in electrical communication and operatively controlled with said on-board computer.

17. The multi-phase fuel system as set forth in claim 16, wherein said fuel injector produces a superfine atomized spray when said fuel injector is actuated by said onboard computer.

18. The multi-phase fuel system as set forth in claim 9, wherein said canister fresh air inlet includes at least one air inlet control means for allowing fresh air to enter said canister.

19. The multi-phase fuel system as set forth in claim 18, wherein said at least one air inlet control means is a check valve whereby said at least one check valve opens to allow fresh air to enter said canister bore when the pressure differential across said check-valve is sufficient and said check valve closes said fresh air inlet aperture to prevent said air/fuel mixture from flowing out of said canister when said pressure differential across said check valve is insufficient.

20. The multi-phase fuel system as set forth in claim 19, wherein said check valve requires at least about one half pound of pressure differential to open and allow said fresh air to enter said canister.

21. The multi-phase fuel system as set forth in claim 19, wherein said check valve includes at least one aperture which is at least about one sixteenth of an inch in diameter.

22. The multi-phase fuel system as set forth in claim 9, wherein said canister bore includes at least one insulating layer for preventing the loss of internal heat.

23. A multi-phase fuel system kit for use with an internal combustion engine, said engine having a liquid fuel system including a fuel source which exists in a liquid state at normal atmospheric pressure and temperature and a fuel delivery means in fluid communication with said fuel source for delivering said liquid fuel from said fuel source to said liquid fuel system, wherein said fuel system kit provides a combination of vaporized high volatility components of gasoline and atomized lower volatility components of gasoline to said engine based on engine demands, comprising:
   a diverter valve means for diverting said liquid fuel from said liquid fuel system to said multi-phase fuel system;
   a separator means for supplying a mixture of vaporized lower temperature boiling components of fuel and atomized higher temperature boiling components of gasoline to said engine, said separator means in fluid communication with said fuel source;
   wherein said internal combustion engine includes an onboard computer for monitoring fuel requirements as a function of engine demand, said on-board computer in operational control of said separator means.

24. The multi-phase fuel system kit as set forth in claim 23 wherein said multi-phase fuel system kit includes an air-gas mixing device;
   wherein said air-gas mixing device utilizes intake manifold pressure of said engine to control the amount of said vaporized low boiling components of fuel and said atomized high boiling components of fuel introduced into the airstream entering said engine.

25. The multi-phase fuel system kit as set forth in claim 23 including a liquid fuel regulating means for regulating said liquid fuel supplied to said multi-phase fuel system by said fuel delivery means.

26. The multi-phase fuel system kit as set forth in claim 25, wherein said liquid fuel regulating means includes a pressure regulator for regulating the pressure of said liquid fuel supplied to said multi-phase fuel system.

27. The multi-phase fuel system kit as set forth in claim 26, wherein said pressure regulator utilizes engine manifold vacuum to regulate the pressure of said liquid fuel supplied to said multi-phase fuel system by said fuel delivery means.

28. The multi-phase fuel system kit as set forth in claim 23, wherein said liquid fuel regulating means includes a liquid fuel flow regulator.

29. The multi-phase fuel system kit as set forth in claim 28, wherein said liquid fuel flow regulator is operatively controlled by said on board computer.

30. The multi-phase fuel system kit as set forth in claim 23, wherein said means for supplying a mixture of vaporized low boiling components of fuel and atomized high boiling components of fuel comprises:
- a canister, said canister having an internal bore, a fresh air inlet aperture and an air-fuel mixture outlet aperture;
- at least one heating element means for supplying heat to said canister bore, said heating element means being removably attached to said canister;
- at least one fuel modulating means for controlling liquid fuel admitted into said canister bore, said fuel modulating means constructed and arranged for removable attachment to said canister, said fuel modulating means in electrical communication and operatively controlled by said on-board computer.

31. The multi-phase fuel system kit as set forth in claim 30, wherein said heating element means is in electrical communication and operatively controlled by at least one electrical switch.

32. The multi-phase fuel system kit as set forth in claim 31, wherein said heating element means is in electrical communication and operatively controlled by said on board computer.

33. The multi-phase fuel system kit as set forth in claim 30, wherein said heating element means for supplying heat to said canister bore includes at least one electrical glow plug.

34. The multi-phase fuel system kit as set forth in claim 30, wherein said heating element means includes at least one resistor, said at least one resistor constructed and arranged to operatively control the temperature of said heating element means.

35. The multi-phase fuel system kit as set forth in claim 30, wherein said heating element means includes at least one rectifier bridge, said at least one rectifier bridge constructed and arranged to operatively control the temperature of said heating element means.

36. The multi-phase fuel system kit as set forth in claim 30, wherein said canister bore includes at least one sensor for monitoring temperature within said canister bore, said sensor being removably attached to said canister, said sensor being in electrical communication with said on-board computer;
wherein said on board computer utilizes said sensor to operatively control said heating elements means to regulate temperature within said canister bore.

37. The multi-phase fuel system kit as set forth in claim 30, wherein said fuel modulating means for controlling liquid fuel admitted into said canister bore comprises at least one fuel injector, said fuel injector in electrical communication and operatively controlled with said on-board computer.

38. The multi-phase fuel system kit as set forth in claim 37, wherein said fuel injector produces a superfine atomized spray when said fuel injector is actuated by said on-board computer.

39. The multi-phase fuel system kit as set forth in claim 30, wherein said canister fresh air inlet includes at least one air inlet control means for allowing fresh air to enter said canister.

40. The multi-phase fuel system as set forth in claim 39, wherein said at least one air inlet control means is a check valve whereby said at least one check valve opens to allow fresh air to enter said canister bore when the pressure differential across said check-valve is sufficient and said check valve closes said fresh air inlet aperture to prevent said air/fuel mixture from flowing out of said canister when said pressure differential across said check valve is insufficient.

41. The multi-phase fuel system as set forth in claim 40, wherein said check valve requires at least about one half pound of pressure differential to open and allow said fresh air to enter said canister.

42. The multi-phase fuel system as set forth in claim 40, wherein said check valve includes at least one aperture which is at least one sixteenth of an inch in diameter.

43. The multi-phase fuel system as set forth in claim 30, wherein said vaporizing chamber includes at least one insulating layer for preventing the loss of internal heat.

44. A method as practiced on an internal combustion engine for supplying the components of a liquid fuel to said engine in at least two different phases to enhance combustion and reduce emissions comprising;
supplying said liquid fuel to a fuel regulating means;
atomizing said liquid fuel, whereby said atomized liquid fuel is directed across at least one heating element means;
heating said atomized liquid fuel, whereby said at least one heating element means is maintained at a predetermined temperature for vaporizing the higher volatility components of said atomized liquid fuel;
mixing said vaporized higher volatility fuel components and said atomized lower volatility fuel components with fresh air;
supplying said multi-phase fuel/air mixture to incoming air entering said engine for combustion as required by engine demands.

45. The method of claim 44 wherein said atomizing step includes at least one electric fuel injector operatively positioned so as to cause said liquid fuel to be injected as a fine atomized mist and advance across said at least one heating element.

46. The method of claim 45 wherein said electric fuel injector is operatively controlled to inject said liquid fuel in response to engine demands sensed by an on-board computer.

47. The method of claim 44 wherein said heating step includes at least one electric heating element operatively controlled to maintain a predetermined temperature.

48. The method of claim 47 wherein said at least one heating element is operatively controlled to raise the temperature of said atomized liquid fuel to about 250° F.

49. The method of claim 47 wherein said at least one electric heating element is a glow plug.

* * * * *